Figure 1:
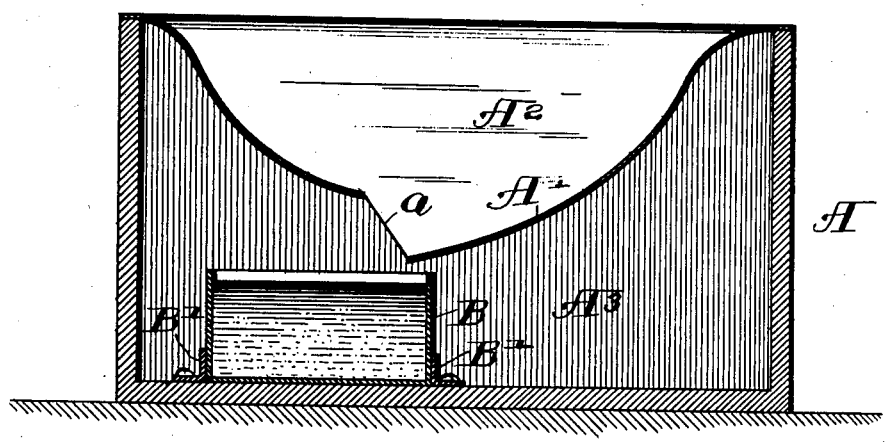

No. 762,562. PATENTED JUNE 14, 1904.
W. H. STRICKLER.
PROCESS OF PRESERVING EGGS.
APPLICATION FILED MAR. 19, 1903.
NO MODEL.

Witnesses:- Inventor:
William H. Strickler
by Poole & Brown
his Attorneys

No. 762,562.

Patented June 14, 1904.

UNITED STATES PATENT OFFICE.

WILLIAM H. STRICKLER, OF CHICAGO, ILLINOIS.

PROCESS OF PRESERVING EGGS.

SPECIFICATION forming part of Letters Patent No. 762,562, dated June 14, 1904.

Application filed March 19, 1903. Serial No. 148,559. (No specimens.)

*To all whom it may concern:*

Be it known that I, WILLIAM H. STRICKLER, of Chicago, in the county of Cook and State of Illinois, have invented certain new and useful Improvements in Processes of Preserving Eggs; and I do hereby declare that the following is a full, clear, and exact description thereof, reference being had to the accompanying drawings, and to the letters of reference marked thereon, which form a part of this specification.

This invention relates to a novel process of preserving eggs; and the invention consists in the matters hereinafter set forth, and more particularly pointed out in the appended claims.

The object of my novel process is to prevent, by the application of an air-excluding medium to the shell of the egg, the entrance of air into the interior of the egg through the pores of the shell thereof during the cooling of the egg immediately after it has been laid, and thereby avoid the injurious effect of the air coming in contact with the meat of the egg, the air-excluding medium thereafter adhering to the shell and effecting a permanent exclusion of the air from the interior of the egg.

In practicing my process I provide means for rendering impervious to air the shell of the egg while it still retains the animal heat of the fowl and while its contents is still expanded, whereby when the egg subsequently cools and the contents thereof contract air does not pass through the shell to the interior thereof, such as occurs upon the natural cooling of an unprotected egg. I employ for the air-excluding medium any suitable substance by which the exterior of the egg-shell may be invested, the medium being preferably applied to the shell in a liquid state and of such nature that upon the cooling of the egg the external air-pressure forces the substance into the pores of the egg-shell, whereby the shell becomes impervious to the air and excludes its entrance to the interior thereof. Paraffin-oil possesses the desired air-excluding qualities when applied in the manner hereinbefore mentioned, and I have used this substance with a high degree of success. Said air-excluding medium should be applied to the egg before the latter has lost any appreciable amount of its temperature in order to secure the best results and to this end should be applied to the egg-shell as soon as practicable after the egg is laid.

A convenient mode of carrying out my novel process consists in placing beneath or adjacent to the nest of the fowl a receptacle containing an air-excluding medium in liquid state and providing the nest with means whereby the egg immediately after it is laid is submerged in the liquid air-excluding bath, in which bath the egg is allowed to cool. For this purpose the nest may be provided in its bottom with an exit-opening for the eggs, located over the air-excluding bath-receptacle and toward which the bottom wall of the nest slants or converges, whereby the newly-laid egg immediately falls from the nest into said bath.

In the drawings I have shown a nest of this construction, wherein—

Figure 2:
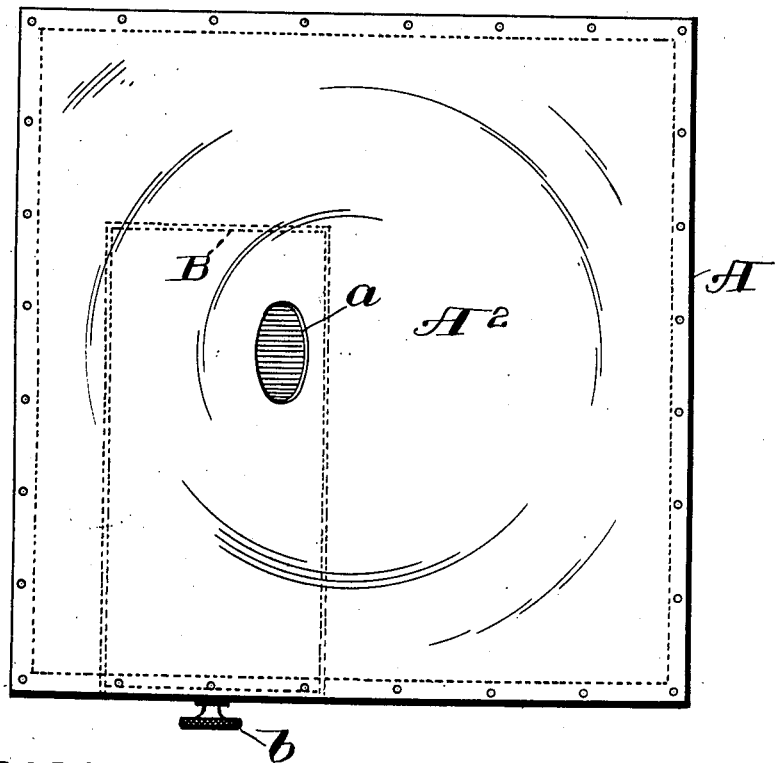

Figure 1 is a transverse vertical section of the nest and the associated agency for applying the air-excluding medium. Fig. 2 is a top plan view of said nest.

As shown in said drawings, A designates an open-topped box or inclosure, which is divided by an irregular-shaped partition A' into an upper or nest compartment A² and a lower compartment A³. The partition A' constitutes the bottom of the nest and is centrally depressed to give thereto the proper form for the nest-bottom. Said nest-bottom is provided at its lowest part, near the center thereof, with an opening $a$, through which the eggs may pass from the nest to the compartment A³ below said nest-bottom. Located below said opening $a$ is an open-topped receptacle B, which is partially filled with a liquid bath of air-excluding substance. The bath is therefore located in position to receive the eggs as they drop through the opening $a$ from the nest, so that in the transmission of the egg from the nest to the bath no appreciable amount of heat is lost. The receptacle B is located closely subjacent to the bottom of the nest, the level of the liquid in the receptacle being so close to the opening $a$ that there is no tendency of the eggs to break as they drop from the nest to said bath. The eggs upon dropping into said bath immediately become submerged, so that as they subsequently become cooled no part of the shell is exposed to the air. Preferably the receptacle has the form of a sliding drawer and slides between parallel horizontal guides in the bottom of the compartment $A^3$. One end of the drawer extends through one side wall of the inclosure A and is provided with a knob or drawer-pull $b$, by which the drawer is withdrawn for the purpose of removing the eggs therefrom. The eggs are dropped into the bath while retaining the animal heat of the fowl, and as they become cool and the contents thereof contract the air-excluding medium of the bath is forced into the pores of the shell, so as to close said pores against the subsequent passage of air therethrough to the interior of the egg. The air-excluding substance may or may not form an external coating or investment for the egg-shell. In either event the closing of the pores of the shell against the passage of air therethrough is the end sought and the attainment of which produces the preservative effect desired.

It is obvious that the apparatus for carrying out my novel process may be widely varied, while retaining the essential features for effectuating the necessary step of my process.

I claim as my invention—

1. The process of preserving eggs which consists in submerging the egg in a liquid, air-excluding medium immediately after it is laid and before it has lost any of the animal heat of the fowl and thereafter removing the egg from said medium.

2. The process of preserving eggs which consists in causing the egg to be passed by its gravity, when it is laid, directly from the fowl to a body of liquid, air-excluding medium whereby it is submerged in said air-excluding medium before it has lost any of the animal heat of the fowl, and thereafter removing the egg from said medium.

In testimony that I claim the foregoing as my invention I affix my signature, in presence of two witnesses, this 17th day of March, A. D. 1903.

WILLIAM H. STRICKLER.

Witnesses:
WILLIAM L. HALL,
GERTRUDE BRYCE.